(12) United States Patent
Wiseman (10) Patent No.: US 7,028,970 B1
(45) Date of Patent: Apr. 18, 2006

(54) ADJUSTABLE POSITION MOUNTING DEVICE

(76) Inventor: Michael D. Wiseman, 5323 Graystone La., Houston, TX (US) 77069

( * ) Notice: Subject to any disclaimer, the term of this patent is extended or adjusted under 35 U.S.C. 154(b) by 0 days.

(21) Appl. No.: 10/822,923

(22) Filed: Apr. 13, 2004

(51) Int. Cl.
*F16M 1/00* (2006.01)

(52) U.S. Cl. ............... 248/669; 248/679; 248/346.01; 108/51.11

(58) Field of Classification Search ............ 248/669, 248/346.01, 678, 346.02, 346.06; 108/51.11, 108/52.1, 54.1, 57.17, 57.21, 57.22, 57.32
See application file for complete search history.

(56) References Cited

U.S. PATENT DOCUMENTS

| | | | | |
|---|---|---|---|---|
| 1,922,050 A | * | 8/1933 | La Bour | 415/111 |
| 1,974,158 A | * | 9/1934 | Okenfuss | 248/651 |
| 2,092,919 A | * | 9/1937 | Johnson | 248/632 |
| 2,828,931 A | * | 4/1958 | Harvey | 410/46 |
| 2,916,233 A | * | 12/1959 | Ecker | 248/679 |
| 3,021,100 A | * | 2/1962 | Verhota | 248/646 |
| 3,036,375 A | * | 5/1962 | Schlosser, Jr. et al. | 29/467 |
| 3,493,201 A | * | 2/1970 | Marran | 248/678 |
| 4,033,531 A | * | 7/1977 | Levine | 248/558 |
| 4,216,933 A | * | 8/1980 | Cramer, Jr. | 248/188.5 |
| 4,572,474 A | * | 2/1986 | Derlich | 248/639 |
| 4,723,756 A | * | 2/1988 | Stumpf, Jr. | 254/93 H |
| 4,917,345 A | * | 4/1990 | Czech | 248/678 |
| 5,080,319 A | | 1/1992 | Nielsen | |
| 5,085,396 A | * | 2/1992 | Mansson | 248/678 |
| 5,110,082 A | * | 5/1992 | Rowan, Jr. | 248/678 |
| 5,497,708 A | * | 3/1996 | Jeruzal | 108/54.1 |
| 6,006,676 A | * | 12/1999 | Creek et al. | 108/55.3 |
| 6,450,782 B1 | * | 9/2002 | Sakamoto | 417/359 |
| 6,464,192 B1 | * | 10/2002 | Gibbs, Jr. | 248/352 |

\* cited by examiner

*Primary Examiner*—Anita M. King
(74) *Attorney, Agent, or Firm*—Andy Arismendi, Jr.

(57) ABSTRACT

A skid has a pair of laterally disposed base members and a first and a second support member for mounting a first and second piece of equipment requiring horizontal axial alignment, for example, a pump and a motor. At least one of the first and second support members is releaseably and adjustably vertically attachable to and between the pair of base members. For example, the first support member is a pair of cross members, wherein each of the cross members is attached at their ends substantially perpendicular to the base members forming a right parallelogram. Further, in this example, the second support member is vertically positioned relative to the base members such that a set of holes in each of the second support member and the pair of base members are horizontally aligned and fasteners are used to secure the two to each other in that position.

15 Claims, 7 Drawing Sheets

ADJUSTABLE POSITION MOUNTING DEVICE

BACKGROUND OF INVENTION

This invention relates to a device for placement between an object and a fixed supporting surface to which the object is mounted, and more particularly to such a device which provides adjustment of the position of the object relative to the fixed supporting surface. In machinery installations, it is common to provide a power source that drives a driven machine. For example, a motor or engine is often mounted adjacent a piece of equipment, such as a pump, gear reducer or the like adapted to be driven thereby. The motor and the driven device are often mounted to the same support plate fixed relative to the supporting surface, for example, a foundation, pad, or floor. In most cases, the height between the motor output shaft and motor mounting structure is different than the height between the input shaft of the driven device and its mounting structure. Placing steel shims between the fixed support plate and the motor and/or the driven device to align the motor output shaft and the input shaft of the driven device customarily accommodates this difference in height. U.S. Pat. No. 5,080,319 to Nielson discloses a mounting device placed between the motor mount and the support plate to make adjustments to this height difference.

Figure 1:
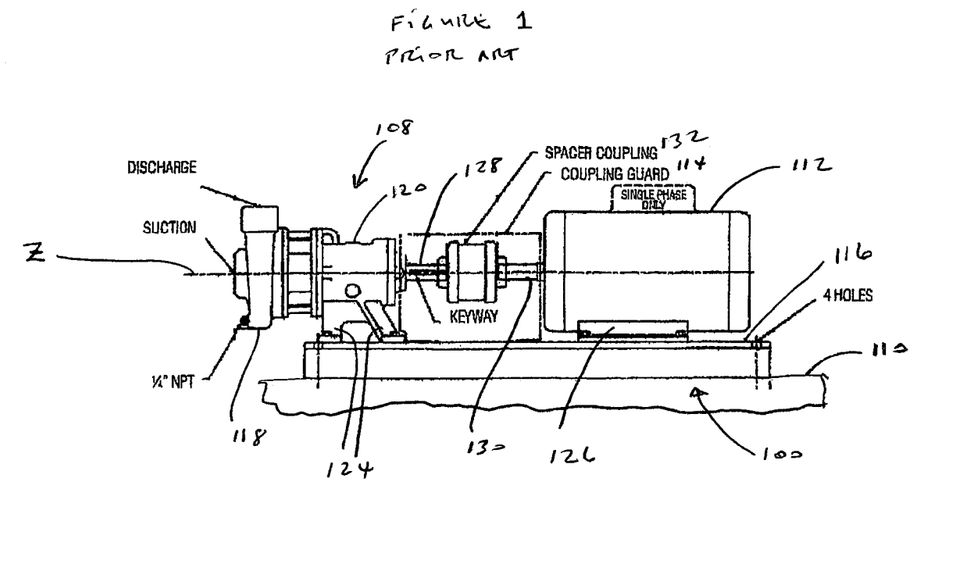
FIG. 1 is a side elevational view, partially in cross section, of a prior art skid with a centrifugal pump mounted thereon.

However, prior art pumps, such as shown in FIG. 1, are manufactured with several sizes of casings 118, for example, three sizes such as 9-inch, 11-inch and 13-inch casings. When a casing size is increased and the load is also increased, a larger motor may be required. When this happens, this creates a problem. Though the casings can be readily changed, the motor mounts typically do not align with the mounting holes in the support plate for the old motor. Additionally, the height difference may be more significant and requires more than the adjustments provided by prior art devices. This typically requires the installation of a new pump skid to accommodate the new motor size and height difference between pump and motor shafts.

Thus, there exists a need to increase the versatility of a pump skid to accommodate changes to different motors when a pump casing is changed and/or the pump load is increased.

SUMMARY OF INVENTION

It is an object of the present invention to provide a mounting device, specifically an equipment skid, and a method which eliminates installation of new equipment skids when at least one of two adjacent pieces of equipment is changed, and in which the relative vertical position of one or both of the pieces of equipment is variable to attain a desired vertical position of one piece of equipment relative to the other. It is a further object of the invention to provide a simple mounting device and method for a piece of equipment which is easy to install and which provides adjustment of the position of one piece of equipment relative to the other. In accordance with one aspect of the invention, a device for adjusting the position of an object relative to a supporting surface includes a base adapted for placement on the supporting surface, a support member adapted for placement adjacent the object, and vertical positioning means for adjusting the position of the support member relative to the base, and thereby the position of the object relative to the supporting surface.

In one aspect of the invention, a skid is provided for mounting a first and second piece of equipment requiring horizontal axial alignment. The skid comprises a pair of laterally disposed base members, a first support member for supporting the first piece of equipment, and a second support member for supporting the second piece of equipment. At least one of the first and second support members is releaseably attached to and between the pair of base members and is adjustably positioned relative to the pair of base members to substantially provide the required horizontal axial alignment of the first and second pieces of equipment.

In one preferred embodiment, the second support member is releaseably attached to and between the pair of base members and is adjustably positioned in the vertical direction relative to the pair of base members. Optionally, the first support member is releaseably attached to and between the pair of base members and is adjustably positioned in the vertical direction relative to the pair of base members.

In another embodiment, the first support member comprises a first pair of cross members, wherein each of the first pair of cross members is attached at their ends substantially perpendicular to the base members forming a right parallelogram. Optionally, each of the first pair of cross members is releaseably attached to and between the pair of base members and is adjustably positioned in the vertical direction relative to the pair of base members.

In another embodiment, the second support member comprises a second pair of cross members and wherein each of the second pair of cross members is releaseably attached at their ends to and between the pair of base members forming a right parallelogram and is adjustably positioned in the vertical direction relative to the pair of base members. The first support member comprises a first pair of cross members, wherein each of the first pair of cross members is attached at their ends substantially perpendicular to the base members forming a right parallelogram. Optionally, each of the first pair of cross members is releaseably attached to and between the pair of base members and is adjustably positioned in the vertical direction relative to the pair of base members.

In another embodiment, the second support member comprises a second mounting plate having a pair of opposing edges and a second pair of side walls extending perpendicularly from the pair opposing edges of the second mounting plate, wherein the second support member is releaseably attached at the second pair of side walls to and between the pair of base members and is adjustably positioned in the vertical direction relative to the pair of base members. The first support member comprises a first pair of cross members, wherein each of the first pair of cross members is attached at their ends substantially perpendicular to the base members forming a right parallelogram.

In yet another embodiment, the first support member is releaseably attached to and between the pair of base members and is adjustably positioned in the vertical direction relative to the pair of base members. For example, the first support member comprises a first mounting plate having a pair of opposing edges and a first pair of side walls extending perpendicularly from the pair opposing edges of the first mounting plate. The first support member is releaseably attached at the first pair of side walls to and between the pair of base members and is adjustably positioned in the vertical direction relative to the pair of base members. Additionally, the second support member comprises a second mounting plate having a pair of opposing edges and a second pair of side walls extending perpendicularly from the pair opposing edges of the second mounting plate. The second support member is releaseably attached at the second pair of side walls to and between the pair of base members and is adjustably positioned in the vertical direction relative to the pair of base members.

In another preferred embodiment, the first support member comprises a first pair of cross members, wherein each of the first pair of cross members is attached at their ends substantially perpendicular to the base members forming a right parallelogram. Optionally, each of the first pair of cross members is releaseably attached to and between the pair of base members and is adjustably positioned in the vertical direction relative to the pair of base members. In one embodiment, the second support member comprises a second pair of cross members and wherein each of the second pair of cross members is releaseably attached at their ends to and between the pair of base members forming a right parallelogram and is adjustably positioned in the vertical direction relative to the pair of base members. In an alternative embodiment, the second support member comprises a second mounting plate having a pair of opposing edges and a second pair of side walls extending perpendicularly from the pair opposing edges of the second mounting plate, wherein the second support member is releaseably attached at the second pair of side walls to and between the pair of base members and is adjustably positioned in the vertical direction relative to the pair of base members.

In a preferred embodiment, each of the pair of base members has a vertical surface with a first plurality of vertically disposed holes extending horizontally through the vertical surface and defining at least one horizontally aligned set of holes. The second support member has at least a mounting plate and a pair of side walls extending perpendicularly from a pair opposing edges of the mounting plate. Each of the pair of side walls has a second plurality of vertically disposed holes extending horizontally through the side walls and defining at least one horizontally aligned set of holes parallel to the mounting plate and which correspond to the at least one horizontally aligned set of holes in the pair of base members. A plurality of fasteners are inserted through the corresponding at least one horizontally aligned set of holes in the pair of side walls and in the pair of base members releaseably securing the second support member to the pair of base members at a selected vertical position relative to the pair of base members.

In another preferred embodiment, each of the pair of base members has a vertical surface with a first plurality holes extending horizontally through the vertical surface and defining at least one horizontally aligned set of holes. The second support member comprises a second pair of cross members, wherein each of the second pair of cross members is releaseably attached at their ends substantially perpendicular to the base members forming a right parallelogram and wherein each of the ends of the second pair of cross members has at least one attachment hole. The first plurality of holes are positioned on the vertical face of each of the pair of base members such that the second pair of cross members are attached at a selected vertical and horizontal position to achieve the desired axial alignment of the first and second pieces of equipment. Each of the second pair of cross members has a horizontal surface with a second plurality of holes for attaching the second piece of equipment. A plurality of fasteners inserted through a corresponding set of holes in the ends of the corresponding one of the second pair of cross members with at least one horizontally aligned set of holes in the pair of base members releaseably securing the second pair of cross members to the pair of base members at a selected vertical and horizontal position relative to the pair of base members.

In another preferred embodiment, each of the pair of base members has a vertical surface with a first and second plurality of vertically disposed holes extending horizontally through the vertical surface and defining at least a first horizontally aligned set of holes and a second horizontally aligned set of holes. The first support member comprises a first mounting plate and a first pair of side walls extending perpendicularly from a pair opposing edges of the first mounting plate. Each of the first pair of side walls has a third plurality of vertically disposed holes extending horizontally through the side walls and defining at least a first horizontally aligned set of holes parallel to the first mounting plate and which correspond to the first horizontally aligned set of holes in the pair of base members. The second support member comprises a second mounting plate and a second pair of side walls extending perpendicularly from a pair opposing edges of the second mounting plate. Each of the second pair of side walls has a fourth plurality of vertically disposed holes extending horizontally through the side walls and defining at least a second horizontally aligned set of holes parallel to the second mounting plate and which correspond to the second horizontally aligned set of holes in the pair of base members. A plurality of fasteners inserted through the corresponding first and second horizontally aligned sets of holes in the first and second pairs of side walls and in the pair of base members releaseably securing the first support member to the pair of base members a selected first vertical position relative to the pair of base members and releaseably securing the second support member to the pair of base members a selected second vertical position relative to the pair of base members. The first and second vertical positions can be the same or different.

The invention further contemplates a method for adjusting the vertical position of a support member relative to a base member. In accordance with the method, the support member is provided with a first and second side wall with each side wall having a first plurality of holes and a skid is provided with the base member having a second plurality of holes. A corresponding set of holes on each of the support member side walls and the skid base member are engaged by a first plurality of securing members to fix their relative position. A third plurality of holes is provided on a mounting plate of the skid and one piece of equipment having mounting holes is mounted thereon by attaching it via the mounting holes to a corresponding set of holes of the third plurality of holes using a second plurality of securing members.

The invention further contemplates a method for adjusting the vertical position of a support member relative to a pair of base members. In accordance with the method, the support member is provided having an upper support surface and at least a pair of end surfaces with a first plurality of holes vertically disposed on and horizontally extending through the pair of end surfaces. The pair of laterally disposed base members is provided with a second plurality of holes, wherein each of the pair of base members has a vertical surface and an upper horizontal surface. The support member is placed between the pair of base members. A first set of horizontally aligned holes is selected from the first plurality of holes and the second plurality of holes corresponding to a selected vertical relative placement between the upper support surface and the upper horizontal surface. The first set of horizontally aligned holes are releaseably engaged with a first plurality of securing members to fix the vertical position of the upper support surface relative to the upper horizontal surface. Preferably, the method further comprises providing the upper support surface with a third plurality of holes for mounting a piece of equipment having mounting holes; placing the piece of equipment on the upper support surface; and releaseably attaching the piece of equipment to the upper support surface with a second plurality of securing members using a set of holes of the third plurality of holes corresponding to the mounting holes.

BRIEF DESCRIPTION OF DRAWINGS

For a better understanding of the invention as well as other objects and further features thereof, reference is made to the following detailed description to be read in conjunction with the accompanying drawings, wherein.

DETAILED DESCRIPTION

Reference now should be made to the drawings in which the same reference numbers are used in the different figures to designate the same or similar components.

FIG. 1 illustrates a motor 112 having an output shaft 130 and a pump 108 having an input shaft 128 adapted to be coupled to motor output shaft 130. Both motor 112 and pump 108 are mounted to a support skid 100 on a supporting surface 110. The skid 100 has an upper plate 116 supporting the motor 112 and the pump 108 in axial alignment Z. Motor 112 is provided with a lower mounting plate 126, and pump 108 likewise includes a pair of spaced lower mounting members 124. The pump 108 has a casing 118 connected to a pump frame 120 from which extends the pump shaft 128. In a manner as is known, motor output shaft 130 and pump input shaft 128 are coupled together through a coupling 132 so that pump 108 is driven in response to operation of motor 112. A coupling guard 114 is also shown. While a motor and pump arrangement is illustrated in FIG. 1, it is to be understood that the invention is usable in connection with any two adjacent pieces of equipment in which vertical alignment between the pieces of equipment is desired. To increase the pumping capacity of the pump 108, the casing 118 can be changed. However, this may require the use of a larger motor. In such a situation, the new motor will have to be aligned with the pump such that the motor and pump shafts are axially aligned. But, the vertically height difference may be too large and require a new pump skid 100. Additionally, the lower mounting plate 126 many times will have mounting holes that do not match the mounting holes in the skid 100, thereby requiring additional modifications to the skid 100 or replacement thereof.

Figure 2:
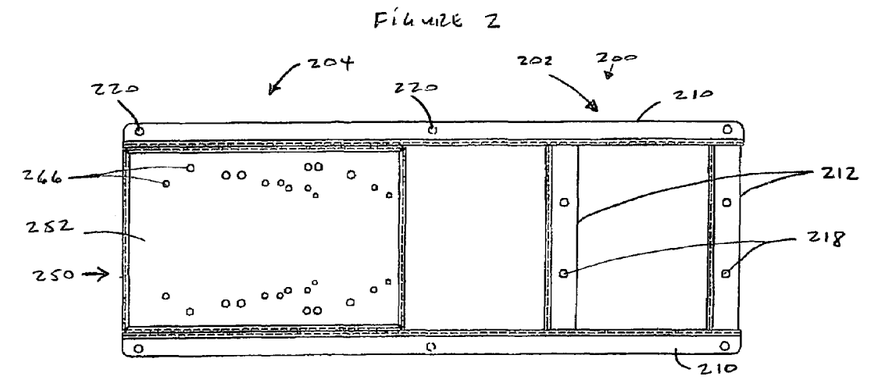
FIG. 2 is a top view of a skid embodiment according to the present invention.
Figure 3:
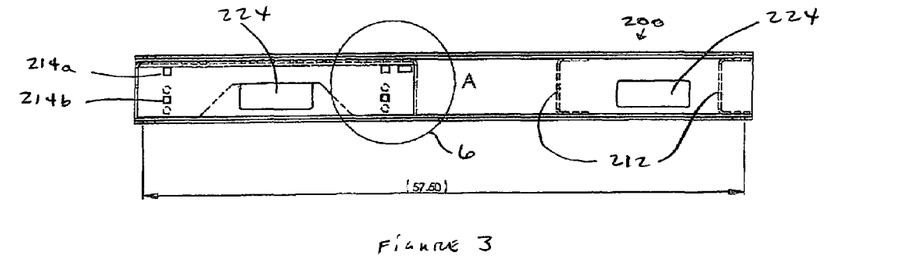
FIG. 3 is a side view of the skid shown in FIG. 2.
Figure 4:
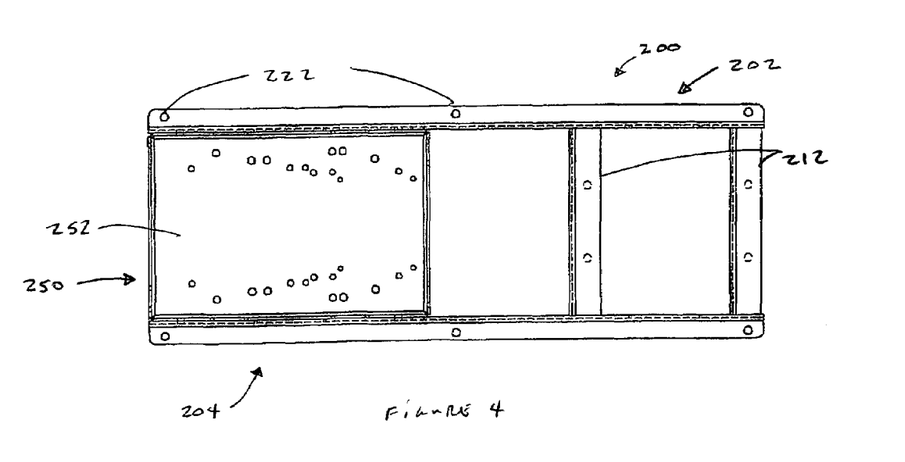
FIG. 4 is a bottom view of the skid shown in FIG. 2.

Referring now to FIGS. 2 through 4, there is shown an embodiment of a skid 200 according to the present invention. The skid 200 has a pair of laterally spaced base members 210. In the pump mounting section 202 of the skid 200, a pair of pump mounting cross members 212 are attached at their respective ends to the inside surface of each of the base members 210. The cross members 212 have pump mounting holes 218. The base members 210 have base holes 214a and 214b, forklift holes 224, holes 220 for attaching lifting eyes, and holes 222 for securing the skid 200 to the supporting surface 110 (see FIG. 1). The skid 200 also has a support member 250, which is secured to and between the base members 210 in the motor mounting section 204 of the skid 200.

Figure 5:
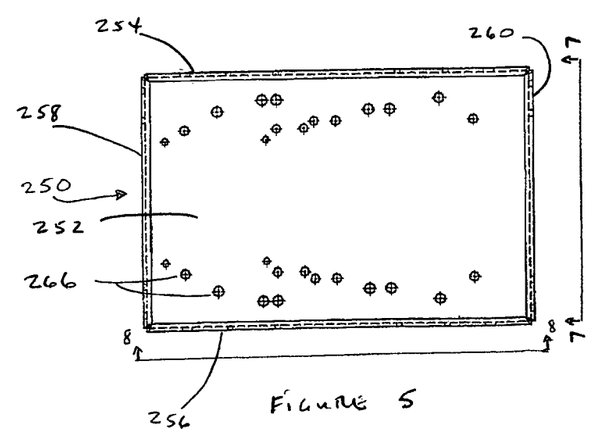
FIG. 5 is a top view of the support member 250 from the skid shown in FIG. 2.
Figure 9:
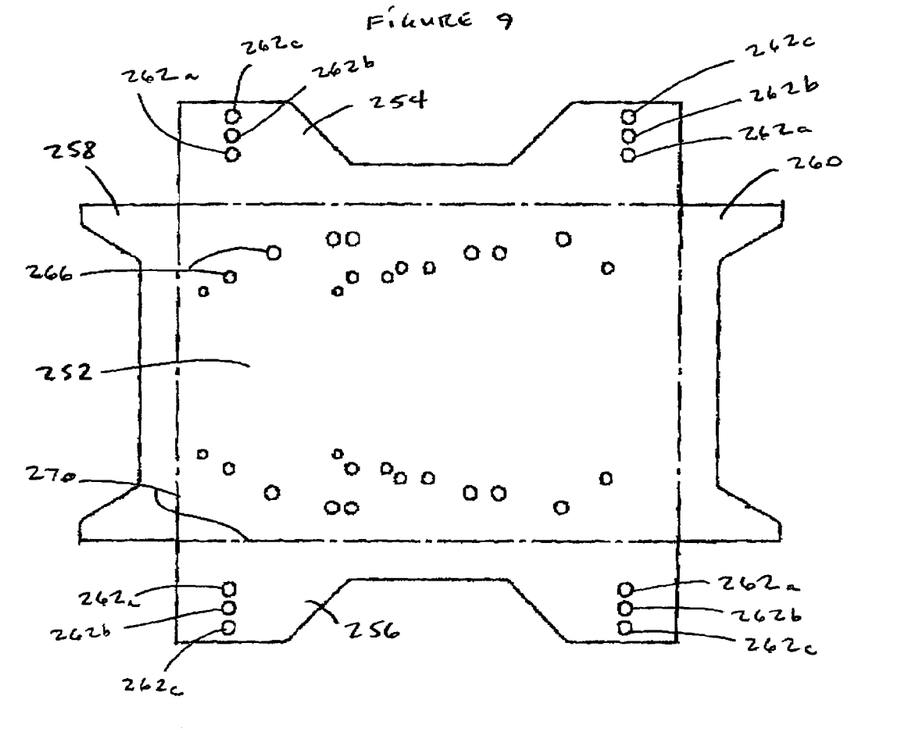
FIG. 9 is a flattened view of the support member shown in FIG. 5.
Figure 10:
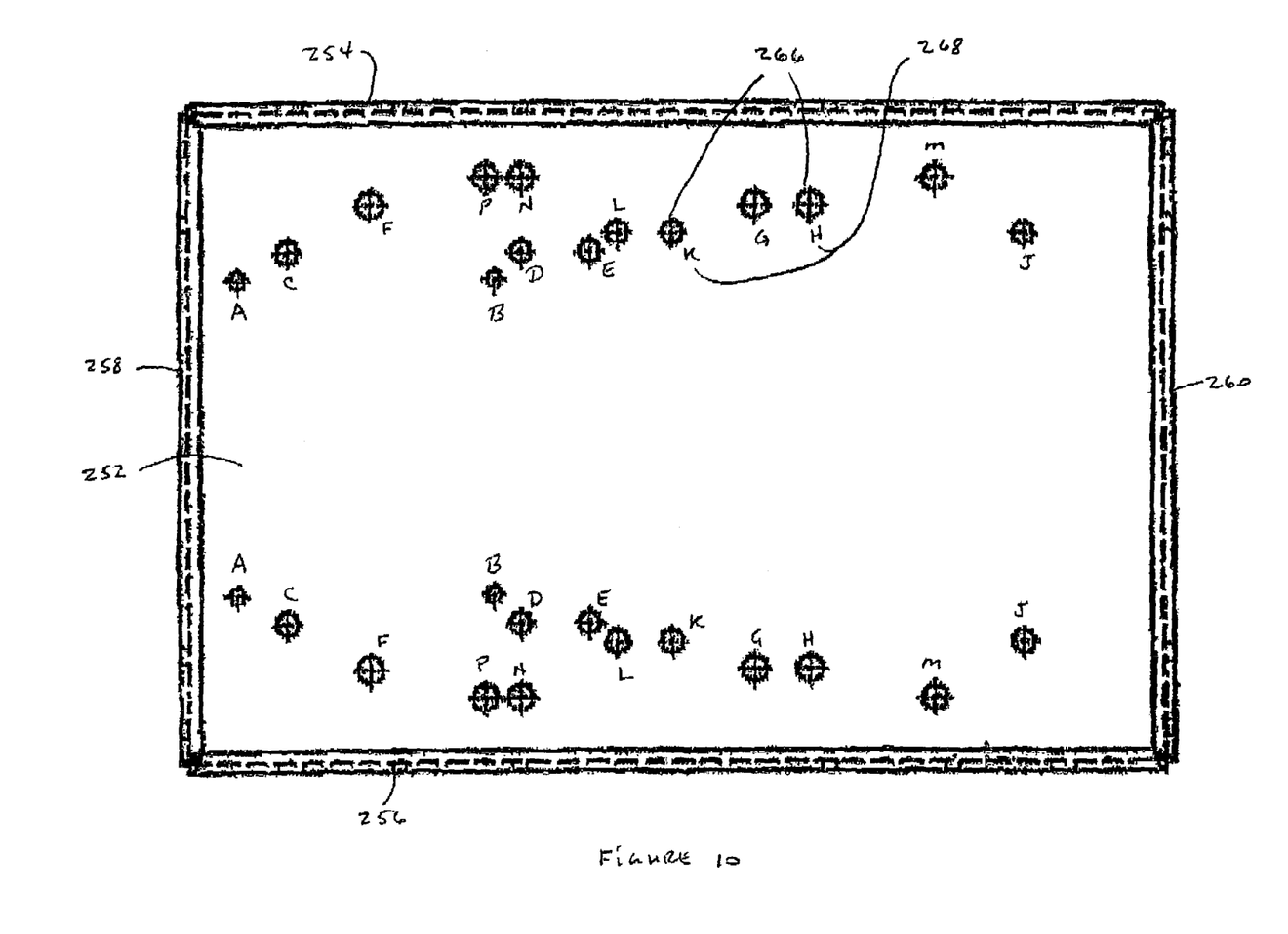
FIG. 10 is an enlarged top view of the support member shown in FIG. 5, which shows the motor mounting holes 266 and the hole designations 268.

Referring now FIGS. 5 and 7 through 10, the support member 250 has a motor mounting plate 252 with side walls 254, 256 and end walls 258, 260 attached to its perimeter. FIG. 9 shows the support member 250 in a flatten form. The support member 250 in FIG. 5 is made from this flatten form shown in FIG. 9 by mechanically bending the side walls 254, 256 and the end walls 258, 260 along the dashed lines 270. The side walls 254, 256 have vertically positioned holes 262a, 262b and 262c. Each of the vertically positioned holes, for example, 262a are at substantially the same vertical distance from the mounting plate 252. The mounting plate 252 has motor mounting holes 266 preferably with a designation 268 (see FIG. 10) which are used to identify the set of mounting holes 266 to be used in mounting a specific motor. See Table 1 below for an example.

Figure 6:
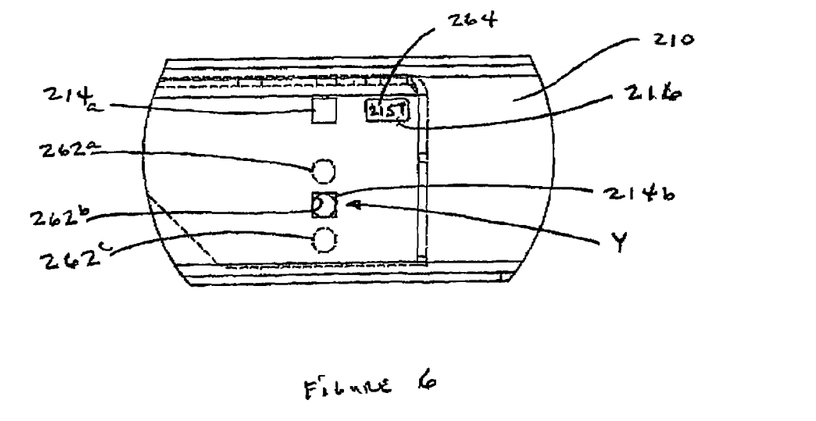
FIG. 6 is an enlarged view of the portion encircled by circle 6 in FIG. 3.
Figure 7:
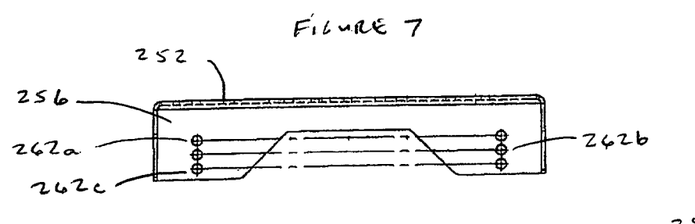
FIG. 7 is a side view of the support member shown in FIG. 5.
Figure 8:
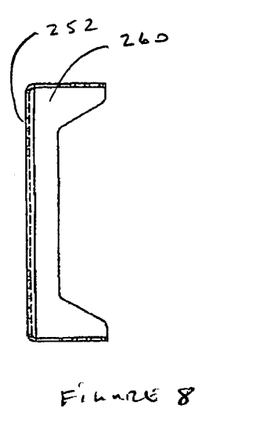
FIG. 8 is an end view of the support member shown in FIG. 5.

Referring now to FIGS. 5 and 6, depending on the motor to be installed, a particular combination of holes 214a, 214b and holes 262a, 262b, 262c are used to properly vertically position the support member 250 relative to the base member 210.

The side walls 254, 256 have a motor designation marking 264 indicating the motor size and/or type corresponding to the holes 262a, 262b, 262c in the side walls 254, 256. Though more combinations of matching holes between holes 262a, 262b, 262c in the side walls 254, 256 and the holes 214a, 214b in the base members 210 may exist, only those combinations with a corresponding motor designation marking 264 showing through a motor designation window 216 in the base member 210 are valid combinations. Referring to FIG. 6, for illustration purposes only, the motor designation 215T on the side wall 254 shows through the window 216 and the arrow Y points to a matching of the holes 214b and 262b.

To accommodate a greater number motor sizes or makes, the mounting plate can be rotated, for example, in increments of 90 degrees if the upper surface of the mounting plate is square (see FIG. 12) or 180 degrees if the upper surface of the mounting plate is rectangular is shape (see FIG. 5). Therefore, if a motor designation marking 264 is on the support member 250 but is not displayable through the window 216, then the support member 250 is rotated prior to insertion into the motor mounting section 204 of the skid 200.

In this case, bolts (not shown) are preferably used to secure the support member 250 to the base members 210 of the skid 200. It will be appreciated that other types of connecting members, such as rivets, pins, cap screws, or the like, may be used instead of bolts.

TABLE 1

HOLE COMBINATIONS

| MOTOR FRAME | Mounting Plate Mounting Holes * |
|---|---|
| 215T | A, B |
| 254T | C, D |
| 256T | C, E |
| 324T | F, G |
| 326T | F, H |
| 284T | J, K |
| 286T | J, L |
| 364T | M, N |
| 365T | M, P |

* First letter corresponds to holes on mounting plate closest to pump. Therefore, the last four motors require that the mounting plate be rotated 180 degrees prior to fixing to the base frame of the skid.

Figure 11:
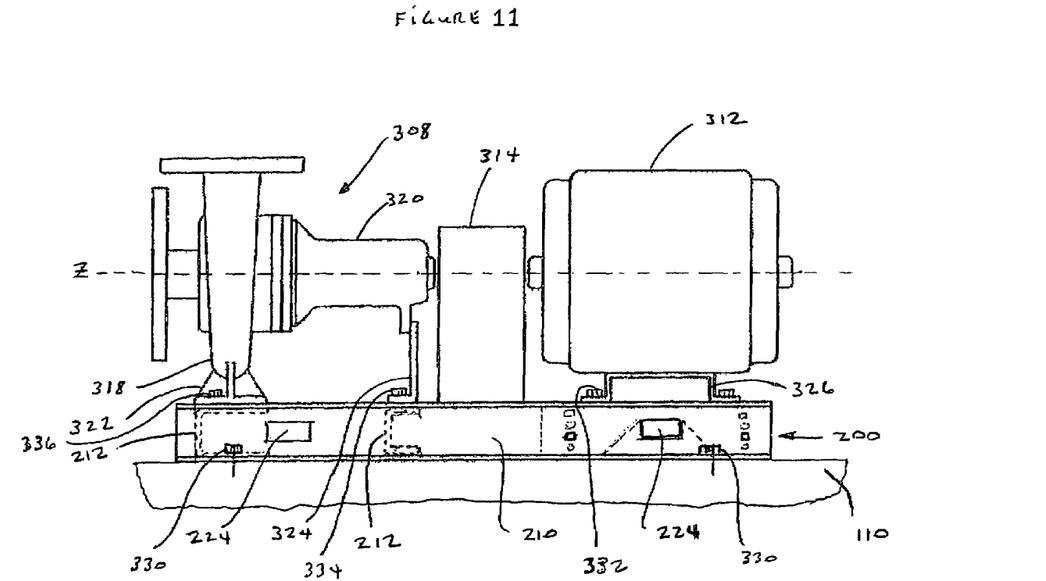
FIG. 11 is a side elevation view of a skid embodiment according to the present invention with a centrifugal pump mounted thereon.
Figure 12:
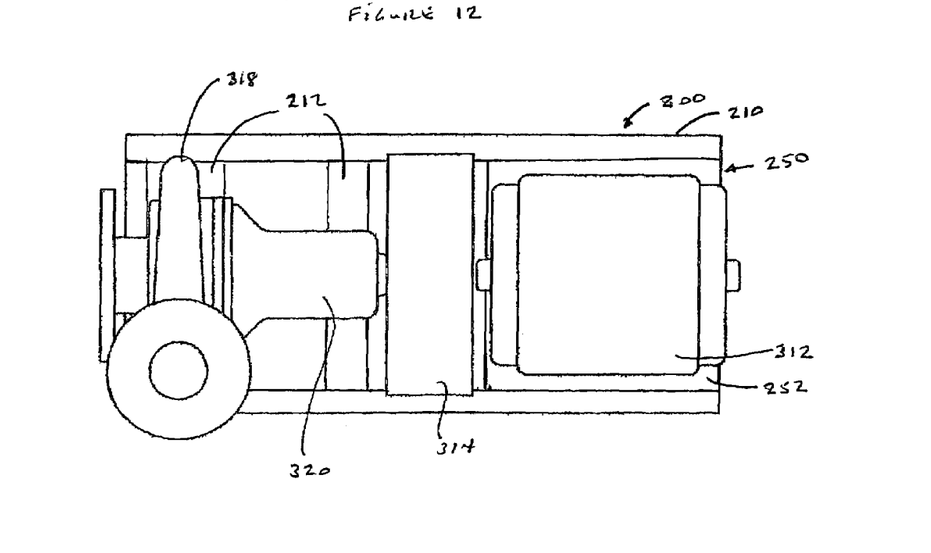
FIG. 12 is a top view of FIG. 11.

Referring now to FIGS. 11 and 12, there is shown a pump 308 and motor 312 mounted in axial alignment Z to a skid 200 on the supporting surface 110. Motor 312 is provided with a lower mounting plate 326, and pump 308 likewise includes a pair of spaced lower mounting members 322, 324. The pump 308 has a casing 318 connected to a pump frame 320 from which extends the pump shaft (not shown), which is covered by the coupling guard 314. Bolts 330, 332, 334, 336 are used to secure the pump and motor to the skid 200 and the skid 200 to the supporting surface 110.

Figure 13:
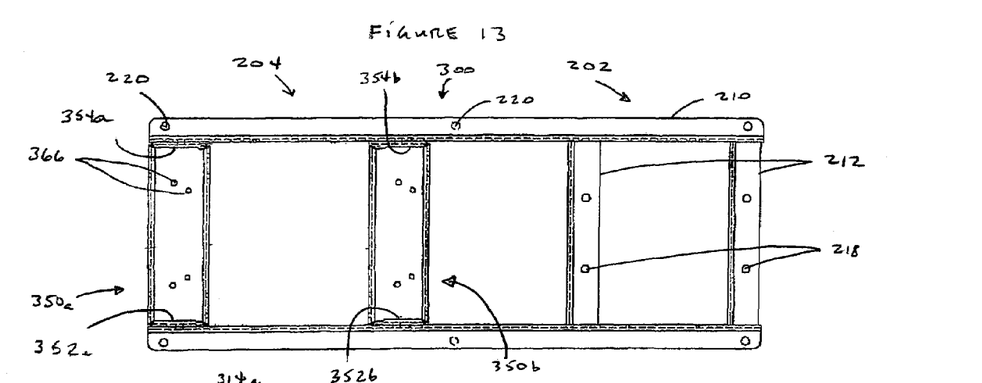
FIG. 13 is a top view of another skid embodiment according to the present invention, where the vertically adjustable support member has two cross members.
Figure 14:
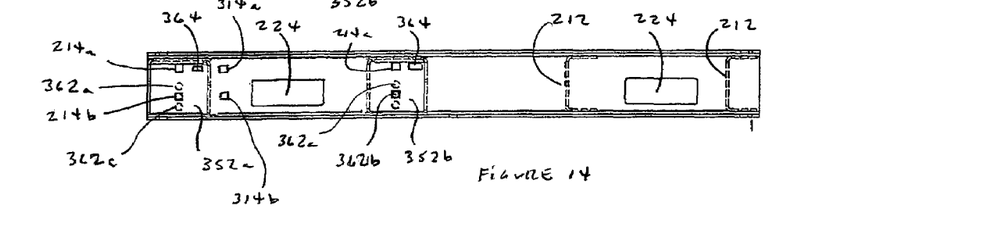
FIG. 14 is a side view of the skid shown in FIG. 13.

Referring now to FIGS. 13 and 14, there is shown an embodiment of a skid 300 according to the present invention. Skid 300 is similar to skid 200, except that support member 250 is replaced with adjustable support members 350a and 350b. Each of support members 350a and 350b is a releaseably attachable cross member similar to cross members 212, but cross members 350a and 350b have end plates 352a, 354a, 352b and 354b attached, respectively, to the ends thereof. The cross members 350a, 350b have a plurality of motor mounting holes 366, preferably with a designation similar to designation 268 (see FIG. 10), which are used to identify the set of mounting holes 366 to be used in mounting a specific motor. Depending on the motor to be installed, a particular combination of holes 214a, 214b and holes 362a, 362b, 362c are used to vertically position the support members 350a, 350b relative to the base members 210 using a plurality of fasteners (not shown for the sake of clarity). The end plates 352a and 352b have a motor designation similar to marking 264 (see FIG. 6) indicating motor size and/or type corresponding to holes 362a, 362b, 362c in the end plates 352a, 354a, 352b and 354b. Though more combinations of matching holes between holes 362a, 362b, 362c in the end plates 352a, 354a, 352b and 354b and the holes 214a, 214b in the base members 210 may exist, only those combinations with a corresponding motor designation 364 similar to marking 264 showing through a motor designation window 216 in the base member 210 are valid combinations. For example, referring to FIG. 6, for illustration purposes only, the motor designation 215T on the side wall 254 shows through the window 216 and the arrow Y points to a matching of the holes 214b and 262b. To accommodate a greater number of motor sizes or makes, the base members 210 can have additional holes, for example, holes 314a, 314b to axially move the cross member 352a. prior to releaseably attaching it to the base members 210.

Figure 15:
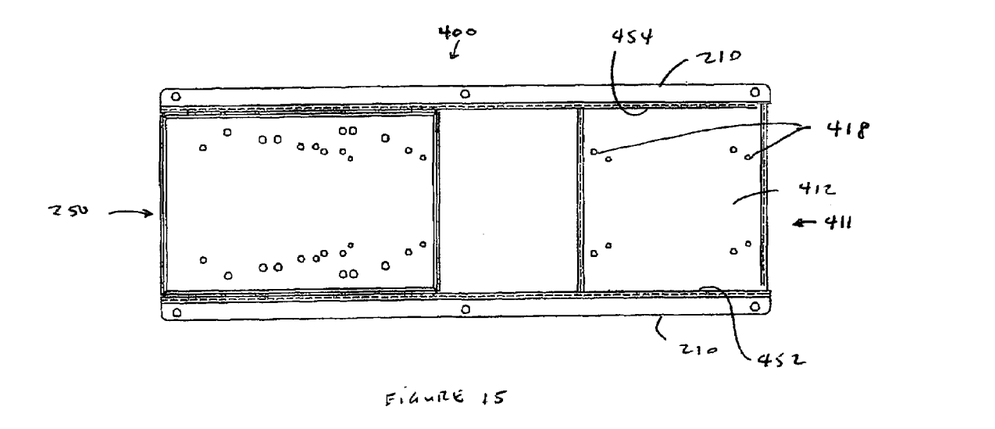
FIG. 15 is a top view of another skid embodiment according to the present invention with two support members that are vertically adjustable, where each support member has a support plate.

Referring now to FIG. 15, there is shown an embodiment of a skid 400 according to the present invention. Skid 400 is similar to skid 200, except that the cross members 212 have been replaced by a vertically adjustable support member 411 with equipment mounting holes 418. Support member 411 is similar to support member 250 in all respects, except for the mounting holes 418 in the mounting plate 412 correspond to the pump mounts. The support member 411 has sidewall 452 and 454, which are like sidewalls 252 and 254 and also have holes like 262a, 262b, 262c. The base members also have holes like holes 214a, 214b for releaseably attaching the support member 411, specifically its mounting plate 412, at a desired vertical position relative to the base members 210. This is similar to what is shown in FIG. 17.

Figure 16:
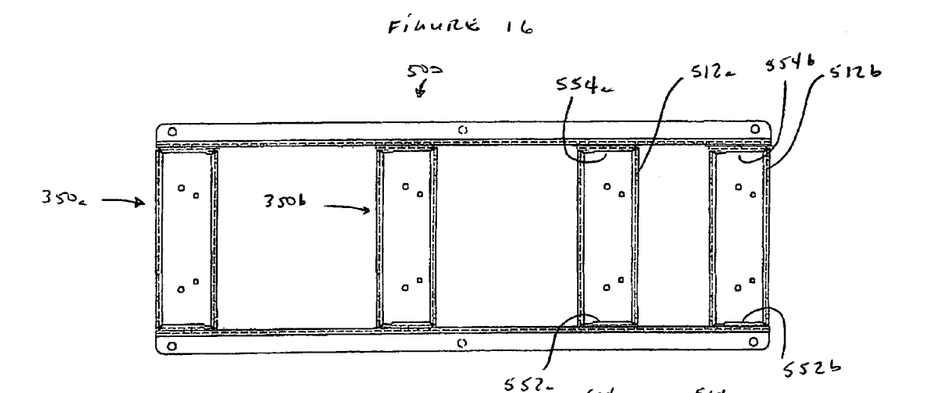
FIG. 16 is a top view of another skid embodiment according to the present invention with two support members that are vertically adjustable, where each support member has two cross members.
Figure 17:
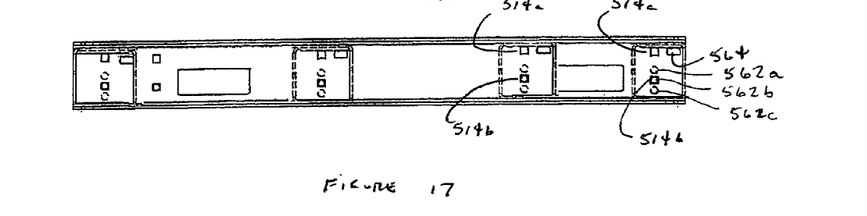
FIG. 17 is a side view of the skid shown in FIG. 16.
Figure 18:
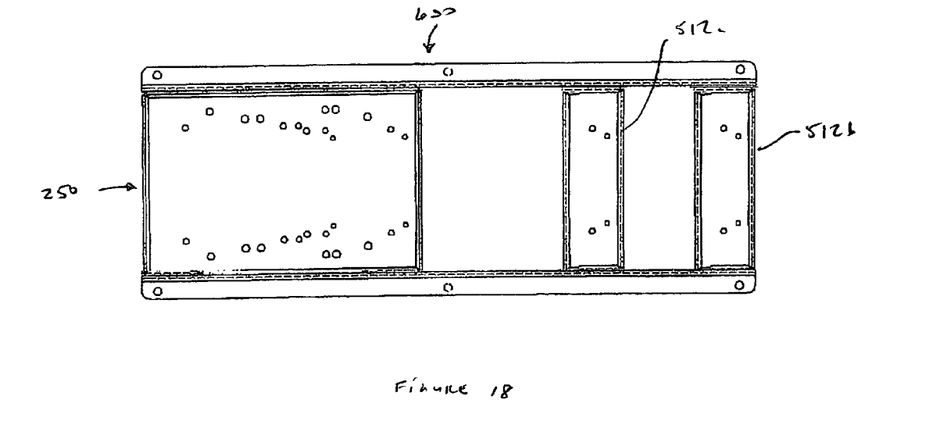
FIG. 18 is a top view of another skid embodiment according to the present invention with two support members that are vertically adjustable, where one support member has a support plate and the other support member has two cross members.

Referring now to FIGS. 16 and 17, there is shown an embodiment of a skid 500 according to the present invention. Skid 500 is similar to skid 300, except that the cross members 212 are now cross members 512a and 512b, which are vertically adjustable rather than fixed. The cross members 512a, 512b are vertically adjustable in the same manner as cross members 350a,350b. The base members 210 have holes 514a, 514b similar to holes 214a, 214b. The cross members 512a and 512b have end plates 552a, 552b, 554a and 554b attached to the ends of cross members 512a and 512b, respectively. The end plates 552a, 552b, 554a and 554b have holes 562a, 562b, 562c, which are vertically aligned with and releaseably secured to holes 514a or 514b to vertically position the support members 512a and 512b relative to the base members 210. A designation window 564 can be used in similar fashion to designation window 264 and 364, but in this case to indicate the type and/or size of pump.

The invention claimed is:

1. A skid for mounting first and second pieces of equipment requiring horizontal axial alignment, the skid comprising:

a pair of laterally disposed base members, a first support member for supporting the first piece of equipment, and a second support member for supporting the second piece of equipment, wherein the second support member is releaseably attached to and between the pair of base members and is adjustable positioned relative to the pair of base members to substantially provide the required horizontal axial alignment of the first and second pieces of equipment, wherein each of the pair of base members has a vertical surface with a first plurality of vertically disposed holes extending horizontally through the vertical surface and defining at least one horizontally aligned set of holes, and wherein the second support member has at least a mounting plate and a pair of side walls extending perpendicularly from a pair of opposing edges of the mounting plate, wherein each of the pair of side walls has a second plurality of vertically disposed holes extending horizontally through the side walls and defining at least one horizontally aligned set of holes parallel to the mounting plate and which correspond to the at least one horizontally aligned set of holes in the pair of base members, and the skid further comprising a plurality of fasteners inserted through the corresponding at least one horizontally aligned set of holes in the pair of side walls and in the pair of base members releaseably securing the second support member to the pair of base members at a selected vertical position relative to the pair of base members.

2. An apparatus comprising:

first and second pieces of equipment requiring horizontal axial alignment and a skid according to claim 1, wherein the first piece of equipment is on the first support member and the second piece of equipment is on the second support member.

3. The apparatus of claim 2, wherein the second piece of equipment is a motor.

4. The apparatus of claim 3, wherein the first piece of equipment is a pump driven by the motor.

5. The skid according to claim 1, wherein the first support member is releaseably attached to and between the pair of base members and is adjustably positioned relative to the pair of base members, wherein each of the pair of base members has a third plurality holes extending horizontally through the vertical surface and defining at least one horizontally aligned set of holes, and wherein the first support member comprises a pair of cross members, wherein each of the pair of cross members is releaseably attached at their ends substantially perpendicular to the base members forming a right parallelogram, wherein each of the ends of the pair of cross members has at least one attachment hole, wherein the third plurality of holes are positioned on the vertical face of each of the pair of base members such that the pair of cross members are attached at a selected vertical and horizontal position, and wherein each of the pair of cross members has a horizontal surface with a fourth plurality of holes for attaching the first piece of equipment, and the skid further comprising a second plurality of fasteners inserted through a corresponding set of holes in the ends of the corresponding one of the pair of cross members with at least one horizontally aligned set of holes of the third plurality of holes in the pair of base members releaseably securing the pair of cross members to the pair of base members at a selected vertical and horizontal position relative to the pair of base members.

6. A skid for mounting first and second pieces of equipment requiring horizontal axial alignment, the skid comprising:

a pair of laterally disposed base members, a first support member for supporting the first piece of equipment, and a second support member for supporting the second piece of equipment, wherein the second support member is releaseably attached to and between the pair of base members and is adjustably positioned relative to the pair of base members to substantially provide the required horizontal axial alignment of the first and second pieces of equipment, wherein each of the pair of base members has a vertical surface with a first plurality holes extending horizontally through the vertical surface and defining at least one horizontally aligned set of holes, and wherein the second support member comprises a pair of cross members, wherein each of the pair of cross members is releaseably attached at their ends substantially perpendicular to the base members forming a right parallelogram, wherein each of the ends of the pair of cross members has at least one attachment hole, wherein the first plurality of holes are positioned on the vertical face of each of the pair of base members such that the pair of cross members are attached at a selected vertical and horizontal position to achieve the desired axial alignment of the first and second pieces of equipment, and wherein each of the pair of cross members has a horizontal surface with a second plurality of holes for attaching the second piece of equipment, and the skid further comprising a plurality of fasteners inserted through a corresponding set of holes in the ends of the corresponding one of the pair of cross members with at least one horizontally aligned set of holes in the pair of base members releaseably securing the pair of cross members to the pair of base members at a selected vertical and horizontal position relative to the pair of base members.

7. An apparatus comprising:

first and second pieces of equipment requiring horizontal axial alignment and a skid according to claim 6, wherein the first piece of equipment is on the first support member and the second piece of equipment is on the second support member.

8. The apparatus of claim 7, wherein the second piece of equipment is a motor.

9. The apparatus of claim 8, wherein the first piece of equipment is a pump driven by the motor.

10. The skid according to claim 6, wherein the first support member is releaseably attached to and between the pair of base members and is adjustably positioned relative to the pair of base members, wherein each of the pair of base members has a third plurality holes extending horizontally through the vertical surface and defining at least one horizontally aligned set of holes, and wherein the first support member comprises a second pair of cross members, wherein each of the second pair of cross members is releaseably attached at their ends substantially perpendicular to the base members forming a right parallelogram, wherein each of the ends of the second pair of cross members has at least one attachment hole, wherein the third plurality of holes are positioned on the vertical face of each of the pair of base members such that the second pair of cross members are attached at a selected vertical and horizontal position, and wherein each of the second pair of cross members has a horizontal surface with a fourth plurality of holes for attaching the first piece of equipment, and the skid further comprising a second plurality of fasteners inserted through a corresponding set of holes in the ends of the corresponding one of the pair of cross members with at least one horizontally aligned set of holes of the third plurality of holes in the pair of base members releaseably securing the second pair of cross members to the pair of base members at a selected vertical and horizontal position relative to the pair of base members.

11. A skid for mounting first and second pieces of equipment requiring horizontal axial alignment, the skid comprising:

a pair of laterally disposed base members, a first support member for supporting the first piece of equipment, and a second support member for supporting the second piece of equipment, wherein each of the first and second support members is releaseably attached to and between the pair of base members and is adjustably positioned relative to the pair of base members to substantially provide the required horizontal axial alignment of the first and second pieces of equipment wherein each of the pair of base members has a vertical surface with a first and second plurality of vertically disposed holes extending horizontally through the vertical surface and defining at least a first horizontally aligned set of holes and a second horizontally aligned set of holes, and wherein the first support member has at least a first mounting plate and a first pair of side walls extending perpendicularly from a pair opposing edges of the first mounting plate, wherein each of the first pair of side walls has a third plurality of vertically disposed holes extending horizontally through the side walls and defining at least a first horizontally aligned set of holes parallel to the first mounting plate and which correspond to the first horizontally aligned set of holes in the pair of base members, and wherein the second support member has at least a second mounting plate and a second pair of side walls extending perpendicularly from a pair opposing edges of the second mounting plate, wherein each of the second pair of side walls has a fourth plurality of vertically disposed holes extending horizontally through the side walls and defining at least a second horizontally aligned set of holes parallel to the second mounting plate and which correspond to the second horizontally aligned set of holes in the pair of base members, and the skid further comprising a plurality of fasteners inserted through the corresponding first and second horizontally aligned sets of holes in the first and second pairs of side walls and in the pair of base members releaseably securing the first support member to the pair of base members a selected first vertical position relative to the pair of base members and releaseably securing the second support member to the pair of base members a selected second vertical position relative to the pair of base members.

12. An apparatus comprising:

first and second pieces of equipment requiring horizontal axial alignment and a skid according to claim 11, wherein the first piece of equipment is on the first support member and the second piece of equipment is on the second support member.

13. The apparatus of claim 12, wherein the second piece of equipment is a motor.

14. The apparatus of claim 13, wherein the first piece of equipment is a pump driven by the motor.

15. A method for adjusting the vertical position of a support member relative to a pair of base members, the method comprising the steps of:

providing the support member having an upper support surface and at least a pair of end surfaces with a first plurality of holes vertically disposed on and horizontally extending through the pair of end surfaces, providing the pair of laterally disposed base members with a second plurality of holes, wherein each of the pair of base members has a vertical surface and an upper horizontal surface;

placing the support member between the pair of base members;

selecting a first set of horizontally aligned holes from the first plurality of holes and the second plurality of holes corresponding to a selected vertical relative placement between the upper support surface and the upper horizontal surface; and releaseably engaging the first set of horizontally aligned holes with a first plurality of securing members to fix the vertical position of the upper support surface relative to the upper horizontal surface; and providing the upper support surface with a third plurality of holes for mounting a piece of equipment having mounting holes using a set of holes of the third plurality of holes corresponding to the mounting holes.

* * * * *